United States Patent
Mavrofrides

(10) Patent No.: US 9,902,227 B1
(45) Date of Patent: Feb. 27, 2018

(54) VEHICLE REAR SUSPENSION AND METHODS OF OPERATION

(71) Applicant: Demetrios C Mavrofrides, Orlando, FL (US)

(72) Inventor: Demetrios C Mavrofrides, Orlando, FL (US)

(*) Notice: Subject to any disclaimer, the term of this patent is extended or adjusted under 35 U.S.C. 154(b) by 0 days.

(21) Appl. No.: 14/939,778

(22) Filed: Nov. 12, 2015

(51) Int. Cl.
| | | |
|---|---|---|
| B60G 3/12 | (2006.01) | |
| B60G 9/04 | (2006.01) | |
| B60B 35/12 | (2006.01) | |
| B60B 35/14 | (2006.01) | |
| B60K 17/16 | (2006.01) | |

(52) U.S. Cl.
CPC .......... B60G 9/04 (2013.01); B60B 35/122 (2013.01); B60B 35/14 (2013.01); *B60G 2204/4232* (2013.01); *B60K 17/165* (2013.01)

(58) Field of Classification Search
USPC ........... 280/124.119, 124.128; 180/353, 354, 180/359, 360
See application file for complete search history.

(56) References Cited

U.S. PATENT DOCUMENTS

| | | | | |
|---|---|---|---|---|
| 2,300,844 A * | 11/1942 | Olley | .............. | B60G 9/00 180/349 |
| 3,157,242 A * | 11/1964 | Kozicki | ............ | B60G 9/00 267/283 |
| 6,109,630 A * | 8/2000 | Dazy | ................ | B60G 7/00 280/124.11 |
| 6,863,289 B2 * | 3/2005 | Buhl | ............... | B60G 7/005 280/124.111 |
| 8,668,214 B2 * | 3/2014 | Elliott | ............ | B60B 35/004 180/352 |
| 9,180,735 B2 * | 11/2015 | Tipton | ........... | B60B 35/005 |
| 2007/0193815 A1 * | 8/2007 | Hobbs | ........... | B60G 21/007 180/348 |
| 2009/0178875 A1 * | 7/2009 | Bowers | .......... | B60B 35/007 180/359 |
| 2015/0360562 A1 * | 12/2015 | Kamil | ............ | F16H 48/00 180/359 |

* cited by examiner

*Primary Examiner* — Toan To
(74) *Attorney, Agent, or Firm* — Brian S. Steinberger; Law Offices of Brian S. Steinberger, P.A.

(57) ABSTRACT

A vehicle rear suspension system is provided which determines the movement of the rear wheels in relation to the chassis of the vehicle as the vehicle drives over irregular surfaces. Different components of a rear suspension act to limit or control the movement of the rear differential along specific directions or axes.

1 Claim, 2 Drawing Sheets

VEHICLE REAR SUSPENSION AND METHODS OF OPERATION

The present invention relates to the rear suspension for a vehicle and methods of operation thereof.

As used herein and throughout various portions (and headings) of this patent, the terms "invention", "present invention" and variations thereof are not intended to mean the invention of every possible embodiment of the invention or any particular claim or claims. Thus, the subject matter of each such reference should not be considered as necessary for, or part of, every embodiment of the invention or any particular claim(s) merely because of such reference. Also, it should be noted that reference herein and in the appended claims to components and aspects in a singular tense does not necessarily limit the present invention to only one such component or aspect, but should be interpreted generally to mean one or more, as may be suitable and desirable in each particular instance.

Figure 1:
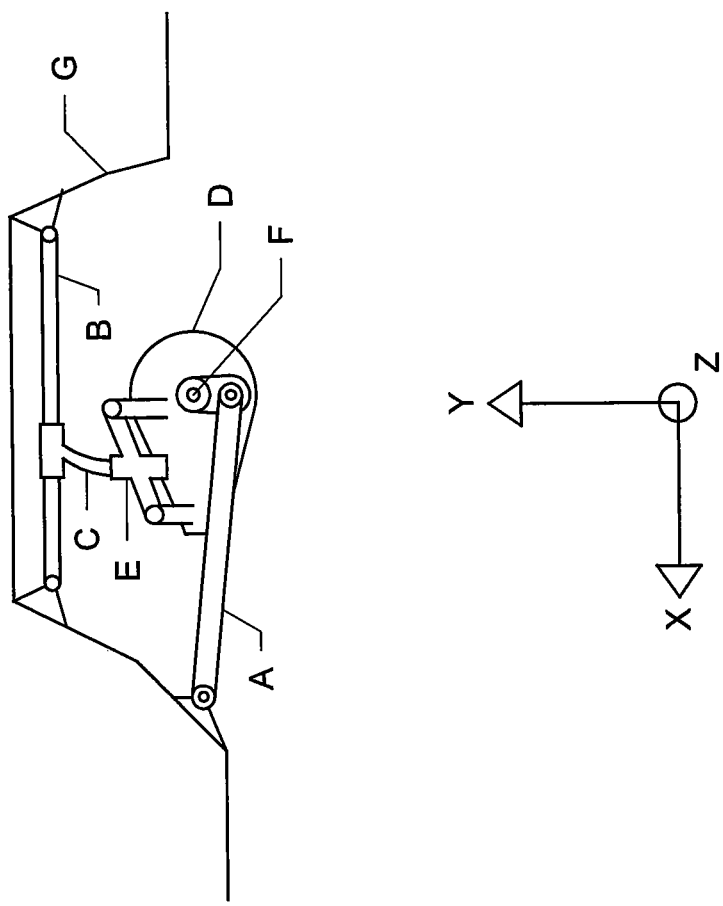
Figure 2:
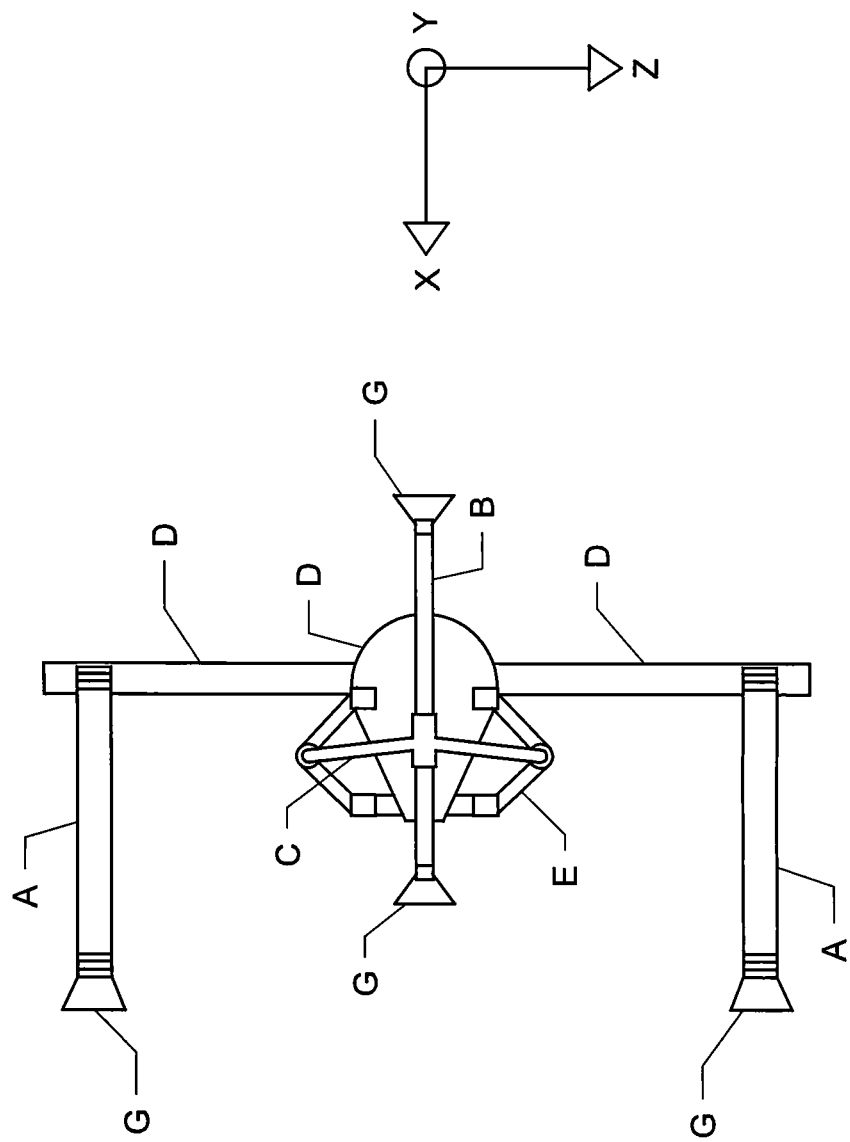

The present invention includes various independent aspects or features. Attached herewith and part of this Provisional Patent Application is a description of sample embodiments of the invention and FIGS. 1-2 showing various views of various particular embodiments of the present invention. The drawings are not necessarily to scale and certain features and certain views of the drawings may be shown exaggerated in scale or in schematic form in the interest of clarity and conciseness. Common or similar components or elements of the various illustrated embodiments are evident based upon the drawings themselves. Any text, graphics and other writings appearing on the attached FIG. Pages are provided only as examples of potential features that may be included in the illustrated embodiments, but which are not required by, or limiting upon, the present invention.

The present invention can have one or more of the features, capabilities or advantages that will be apparent to a person skilled in the art based upon the description below and/or the attached drawings However, the present invention is not limited to the embodiments described herein or shown in the attached drawings, or any particular details thereof. Also, any of the particular features described or shown with respect to one embodiment of the invention may be included in any other embodiment or application of the invention. Further, nothing in this document or the attached drawings or sample embodiment should limit the scope of the present invention, or any patent claims of any patent applications relating hereto. This provisional patent application is intended to provide a written description of examples of various features of the present invention and the manner and process of making and using at least one embodiment sufficient to enable a person skilled in the art to make and use the invention, and to set forth the best mode presently contemplated by the inventor of carrying out the present invention.

Characteristics and advantages of the present invention and additional features and benefits will be readily apparent to those skilled in the art upon consideration of the following description of presently preferred embodiments and referring to the accompanying figures. It should be understood that the description herein and appended drawings, being of preferred embodiments, are not intended to limit the appended claims or the claims of any patent or patent application claiming priority to this application. On the contrary, the intention is to cover all modifications, equivalents and alternatives falling within the spirit and scope of the present invention and claims. Many changes may be made to the particular embodiments and details disclosed herein without departing from such spirit and scope.

BRIEF DESCRIPTION OF VARIOUS EMBODIMENTS OF THE INVENTION

In FIGS. 1-2, the following referenced items refer to the following components:

ITEM A Lower control arm. This is common to many rear suspension systems. There are typically two per vehicle and they are generally located at the outer ends of the Rear Differential (item D).

ITEM B Top Link Guide. This is a part of the present embodiment of the invention. In this embodiment, Top Link Guide is shown perpendicular to the rear differential and parallel to the vehicle centerline. (The vehicle centerline runs the length of the vehicle from back to front and is centered left to right.) In this embodiment, the Top Link Guide is fixed to the chassis and does not move with respect to the chassis.

ITEM C Center Link. This is also a part of the present embodiment of the invention. In this embodiment, the Center Link connects the Top Link Guide with the Differential Link Bracket (item E).

ITEM D Rear Differential. The Rear Differential typically connects the wheels and tires to the body of the vehicle. It typically translates the rotational motion of the engine and transmission, through the drive shaft, to the rotational movement of the rear wheels and tires to propel the vehicle.

ITEM E Differential Link Bracket: This is another part of the present embodiment of the invention. In this embodiment, the Differential Link Bracket is solidly mounted to the differential on either side of the center section of the Rear Differential. For example, it can be a single bracket or two individual brackets. In this embodiment, the Differential Fork Bracket is fixed to the Rear Differential and does not move with respect to it.

ITEM F This point shows where the wheels and tires typically connect to the Rear Differential, the rear axles.

ITEM G This item is the body or chassis of the vehicle.

Referring to FIGS. 1-2, typically, the rear suspension system determines the movement of the rear wheels in relation to the chassis of the vehicle as the vehicle drives over irregular surfaces. Different components of a rear suspension act to limit or control the movement of the rear differential along specific directions or axes.

In this embodiment, the x-axis runs the length of the vehicle, front to back and passes through the Top Link Guide centerline. The y-axis runs vertical from the road surface to the top or roof of the vehicle. The z-axis runs the width of the vehicle left to right or drive side to passenger side. The rear suspension should allow the rear wheels and rear differential to move only in the y-axis direction as it travels along a road.

In a typical scenario, the rear wheels of a rear wheel drive vehicle are attached to the rear differential at points F as shown in FIG. 1. The rear differential is then typically connected to the body or chassis of a vehicle, item G, by the rear suspension system. Over a flat surface, as the rear wheels turn and exert a rotational force on the road surface, friction propels the rear differential forward, along the x-axis, as shown in FIG. 1. The forward movement of the rear differential is then transferred to the lower control arms, which in turn move the vehicle forward. Thus, the main function of the lower control aims is typically to maintain the position of the rear differential with respect to the chassis along the x-axis. The lower control arms are usually linked to the chassis at either end through bushings that allow the rotation of the control arms about the mounting point. This allows movement of the rear differential along the y-axis when the vehicle experiences irregularities in the road surface.

The lower control arms do not, however, typically limit the movement of the rear differential along the z-axis direction or the rotation of the differential about the z-axis. First, as a vehicle enters a turn, centrifugal force may push the chassis of the vehicle toward the outside of the turn while the tires and friction of the road surface keep the rear differential connected to the curve of the road. The centrifugal force typically acts along the z-axis. Secondly, as the drive shaft turns and makes the differential turn the rear wheels, the differential will typically have a tendency to rotate about, not along, the z-axis as the friction of the road surface tries to keep the wheels from turning. In accordance with various embodiments of the present invention the Top Link Guide, Center Link, and/or Differential Link Bracket control this lateral and/or rotational motion of the rear differential with respect to the chassis.

In some embodiments, the side-to-side movement of the rear differential, or movement along the z-axis, is controlled by the Top Link Guide. Since the illustrated Center Link slides over the Top Link Guide, it is limited in motion along or about the x-axis with respect to the chassis or vehicle at the point of attachment. The exemplary Center Link is then connected to the Differential Link Bracket in such a way that the Differential Link Bracket slides over the Center Link arm or vice versa. The Center Link of this embodiment then limits the movement of the rear differential along a perpendicular axis (y-axis) with respect to the Top Link Guide, limiting the differential to movement along only the x-axis and y-axis with respect to the chassis. Of course, the lower control arms typically determine the exact movement of the rear differential along the x-axis as the vehicle passes over irregularities of the road surface. As the wheels move along the y-axis, they cause the rear differential to rotate slightly about the lower control arm mounting points at the vehicle chassis and cause a small movement of the rear' differential along the x-axis.

Friction of the road surface typically acts to rotate the rear differential about the z-axis as the engine and transmission act to turn the wheels during acceleration and stop them during deceleration. In the illustrated embodiment of the invention, the rear differential is limited to movement along the x and y axes by the Top Link Guide, Center Link and/or Differential Link Bracket. This means that as the rear differential tries to rotate about the z-axis, it will try to rotate Center Link about the z-axis which will in turn try to rotate the Top Link Guide about the z-axis also. However, since the Top Link Guide of this embodiment is solidly mounted to the chassis, the rear differential will not rotate about the z-axis with respect to the vehicle chassis.

Since the Differential Link Bracket slides over the Center Link or vice versa of this embodiment, and the Center Link slides about the Top Link Guide, the independent movement of the rear wheels over different road surfaces with respect to each other is allowed. This causes a slight rotation of the rear differential about the x-axis, which is allowed in this embodiment by the Center Link and Top Link Guide since the Center Link can rotate about the Top Link Guide.

Preferred embodiments of the present invention thus offer advantages over the prior art and are well adapted to carry out one or more of the objects of the invention. However, the present invention does not require each of the components and acts described above and is in no way limited to the above-described embodiments or, methods of operation Any one or more of the above components, features and processes may be employed in any suitable configuration without inclusion of other such components, features and processes. Moreover, the present invention includes additional features, capabilities, functions, methods, uses and applications that have not been specifically addressed herein but arc, or will become, apparent from the description herein and the appended drawings and claims.

The methods described or evident from the above description, claims or drawings herein can be performed in any desired suitable order and are not necessarily limited to any particular sequence, even that described herein or as may be listed in the appended claims. Further, the methods of the present invention do not necessarily require use of the particular embodiments shown and described herein, but are equally applicable with any other suitable structure, form and configuration of components.

While preferred embodiments of the invention have been shown and described, many variations, modifications and/or changes of the apparatus and methods of the present invention, such as in the components, details of construction and operation, arrangement of parts and/or methods of use, are possible, contemplated by the patentee, within the scope of the appended claims, and may be made and used by one of ordinary skill in the art without departing from the spirit or teachings of the invention and scope of appended claims. Thus, all matter herein set forth or shown in the accompanying drawings should be interpreted as illustrative and the scope of the invention and the appended claims should not be limited to the embodiments described and shown herein.

What is claimed is:

1. Apparatus for connecting at least two wheels to a chassis of a vehicle, the apparatus including a rear differential engaged between the at least two wheels, the rear differential including a center section, the apparatus comprising:

at least one top link guide solidly mounted to the chassis of the vehicle, said at least one top link guide being elongated and extending at least substantially perpendicular to the rear differential and at least substantially parallel to a centerline of the vehicle;

at least one center link engaged over the at least one top link guide where the center link slides along and rotates about the at least one top link guide and including at least one downwardly extending arm, and at least one differential link bracket solidly mounted to the rear differential on either side of the center section of the rear differential, said differential link bracket slides along and rotates about a respective center link arm of at least one center link, where there is little or no binding between said at least one center link and said at least one differential link bracket relative to one another.

* * * * *